United States Patent [19]
Yoshikawa et al.

[11] Patent Number: 6,097,573
[45] Date of Patent: Aug. 1, 2000

[54] MAGNETIC INFORMATION RECORDER/REPRODUCER

[75] Inventors: Toru Yoshikawa; Yoshiyuki Yamaji, both of Wakayama, Japan

[73] Assignee: Noritsu Koki Co., Ltd., Wakayama, Japan

[21] Appl. No.: 09/105,250

[22] Filed: Jun. 26, 1998

[30] Foreign Application Priority Data

Jun. 27, 1997 [JP] Japan ................................. 9-172205
Apr. 22, 1998 [JP] Japan ................................ 10-112188

[51] Int. Cl.⁷ ............................................... G11B 15/60
[52] U.S. Cl. ............................................... 360/130.32
[58] Field of Search ..................... 360/130.31, 130.32, 360/132, 130.34

[56] References Cited

U.S. PATENT DOCUMENTS 3,749,851   7/1973   Nakamichi .
4,780,782  10/1988   Bordignon ........................ 360/130.31
5,541,685   7/1996   Jessop ................................... 354/106

FOREIGN PATENT DOCUMENTS 446916   9/1991   European Pat. Off. .
555713   8/1993   European Pat. Off. .

*Primary Examiner*—Allen T. Cao
*Attorney, Agent, or Firm*—Weneroth, Lind & Ponack, L.L.P.

[57] ABSTRACT

A magnetic information recorder/reproducer can reduce the possibility of breakage of parts and thus lessen the need for maintenance. A resilient member for pressing a magnetic medium against a magnetic head has a resilient, hard guide layer provided on one side thereof facing the magnetic medium. The guide layer prevents the magnetic medium from coming into contact with the resilient member. The resilient member is thus less like to be broken or worn because it does not contact the magnetic medium.

15 Claims, 3 Drawing Sheets

MAGNETIC INFORMATION RECORDER/REPRODUCER

BACKGROUND OF THE INVENTION

This invention relates to a recorder/reproducer for recording (or writing) magnetic information in a recording medium such as film having a magnetic recording layer and reproducing (or reading) magnetic information recorded in the recording medium.

In printing a film having a magnetic recording layer, magnetic information recorded in the film is read to print the film based on the thus read magnetic information.

A typical magnetic information reader for reading such magnetic information has a magnetic head adapted to be brought into contact with film by a leaf spring. The film is fed while being kept in contact with the head so that the head can read magnetic information recorded in the film.

The head-biasing leaf spring has to be made from a nonmagnetic material because a leaf spring made from a magnetic material might erase magnetic information, thus making accurate reading of magnetic information impossible.

One problem with conventional magnetic information readers is that the leaf spring, made from a nonmagnetic material, tends to be quickly worn or broken due to contact with the film to such an extent as to need replacement. Thus, maintenance is a major problem for conventional magnetic information readers.

An object of this invention is to provide a magnetic information recorder/reproducer which requires less maintenance.

SUMMARY OF THE INVENTION

According to this invention, there is provided a magnetic information recorder/reproducer for recording/reproducing magnetic information on a magnetic medium, comprising a holder, a magnetic head, a resilient member supported by the holder for urging the magnetic medium into contact with the magnetic head, and a hard guide member made of a nonmagnetic material and provided on one side of the resilient member facing the magnetic head.

The guide layer may be a resilient plate strip made of a ceramic material, or a resilient ceramic layer integrally secured to the resilient member. The ceramic layer may be zirconia.

If a ceramic resilient plate strip is used, the holder is provided with a recess and a pair of grooves in which are inserted opposite ends of the resilient plate strip. The resilient member presses the back of the resilient plate strip to urge the magnetic medium into contact with the magnetic head.

By bringing the magnetic medium into contact with the magnetic head by the guide layer, it is possible to use as the resilient member a sufficiently durable leaf spring made of a magnetic material.

Other features and objects of the present invention will become apparent from the following description made with reference to the accompanying drawings, in which:

DETAILED DESCRIPTION OF THE PREFERRED EMBODIMENT

Embodiments of this invention area now described with reference to the drawings.

(First Embodiment)

Figure 1:
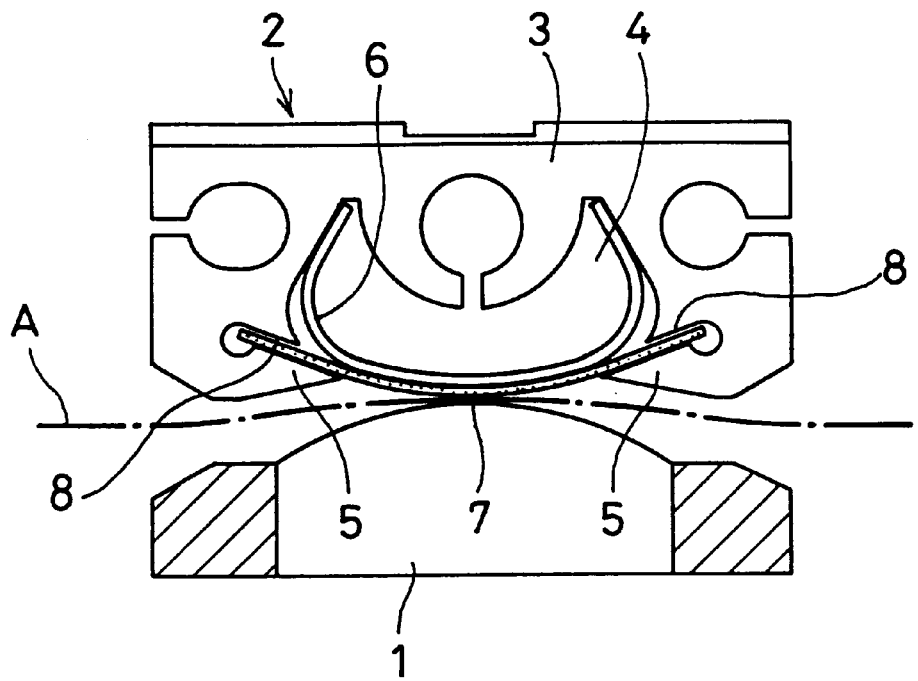
FIG. 1 is a front view of an embodiment of this invention.
Figure 2:
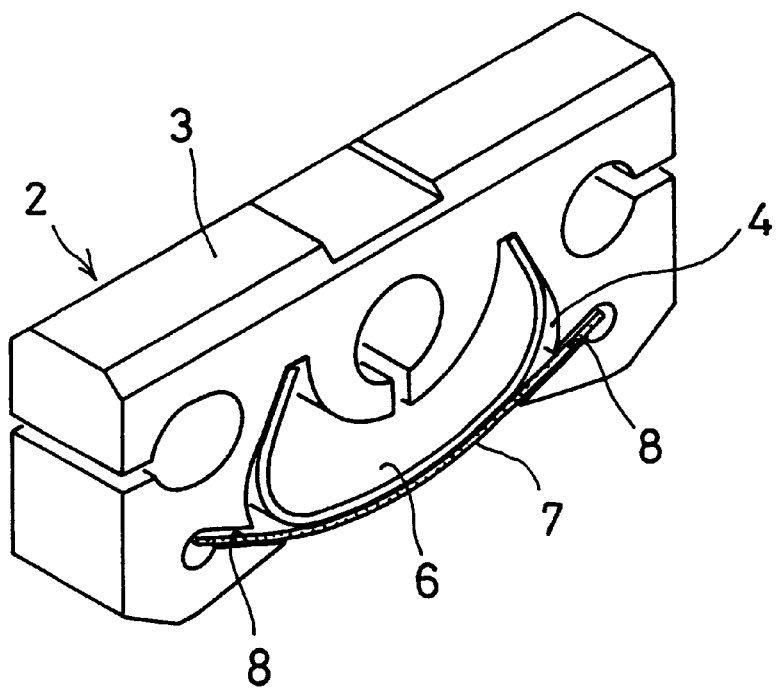
FIG. 2 is a perspective view of a holder unit of the embodiment of FIG. 1.

As shown in FIG. 1, a strip of film A having a magnetic recording medium or layer is fed through a feed path in which is provided a magnetic head 1 for reading magnetic information recorded in the film A.

The film A is brought into contact with the magnetic head 1 by a holder unit 2 provided over the head 1. The holder unit 2 includes a holder 3 formed with a recess 4 having an opening at the bottom of the holder 3. A pair of protrusions 5 protrude inwardly from both sides of the opening of the recess 4.

A resilient member 6 in the form of a metallic leaf spring is mounted in the recess 4. A hard guide layer or member 7 made of a nonmagnetic material is provided on the side of the resilient member 6 facing the film A.

The guide layer 7 comprises a resilient sheet strip made of a ceramic material. Here, zirconia is selected as the ceramic material, and zirconia is formed into a thin sheet having a thickness of 0.05–0.5 mm.

In the above specific embodiment,"CERAFLEX A" made by SUMIKIN PHOTON CERAMIX is used as the resilient sheet strip 7. Such a resilient strip 7 is high in strength, toughness, resilience and resilient deformability.

The resilient sheet strip 7 has opposite ends inserted in grooves 8 formed in the side walls of the recess 4 and a central portion deflected outwardly by the resilient member 6.

The film A is pressed toward the magnetic head 1 by the resilient sheet strip 7 made of a ceramic material and provided on the side of the resilient member 6 facing the film A. While the head is reading magnetic information recorded in the film A, the film is fed while kept in contact with the hard resilient sheet strip 7, so that the resilient member 6 cannot be worn by the film A because it is not in contact with the film A. The resilient member 6 can be used for a longer time without replacement. This significantly reduces the labor for maintenance.

The resilient sheet strip 7 is supported with its opposite ends inserted in the grooves 8 formed in the holder 3. Thus, if the resilient sheet strip 7 is broken, it can be easily replaced with a new one.

In the case of the resilient sheet strip 7 made from zirconia, it is extremely high in resilient deformability, so that even if the tension of the film A changes widely, such a change in tension can be absorbed by resilient deformation of the resilient sheet strip 7. This prevents damage to the resilient sheet strip 7.

(Second Embodiment)

Figure 3:
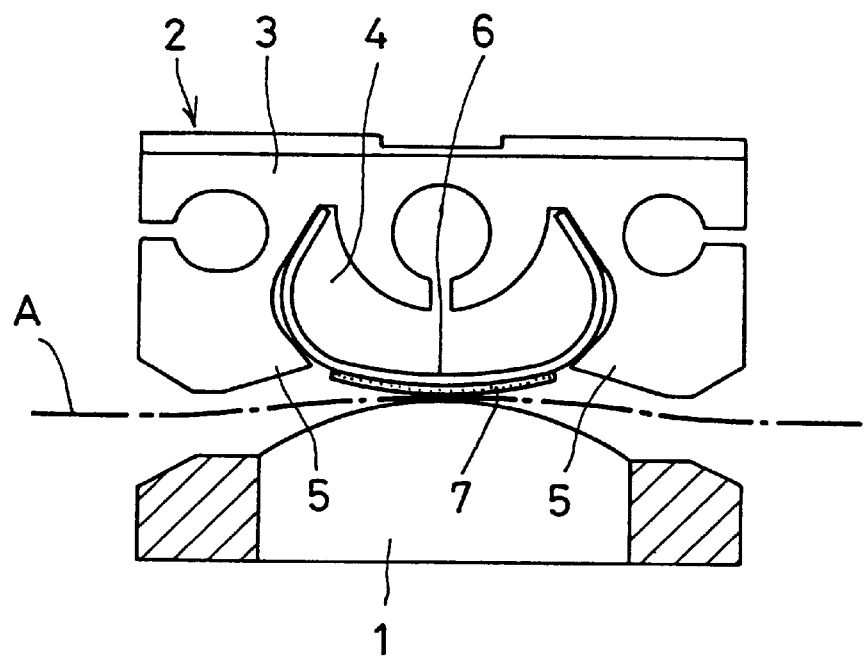
FIG. 3 is a front view of another holder unit.

In the embodiment shown in FIG. 1, the guide layer 7 and the resilient member 6 are separate members. But the guide layer 7 may be formed by thermal-spraying ceramic or zirconia on the central part of the resilient member 6 as shown in FIG. 3.

In this embodiment, film A is shown as a magnetic medium, and magnetic information recorded in the film is read by the head. But the magnetic medium is not limited to film, and may be, e.g., a magnetic tape. Magnetic information is written in such a magnetic medium.

(Third Embodiment)

Figure 4:
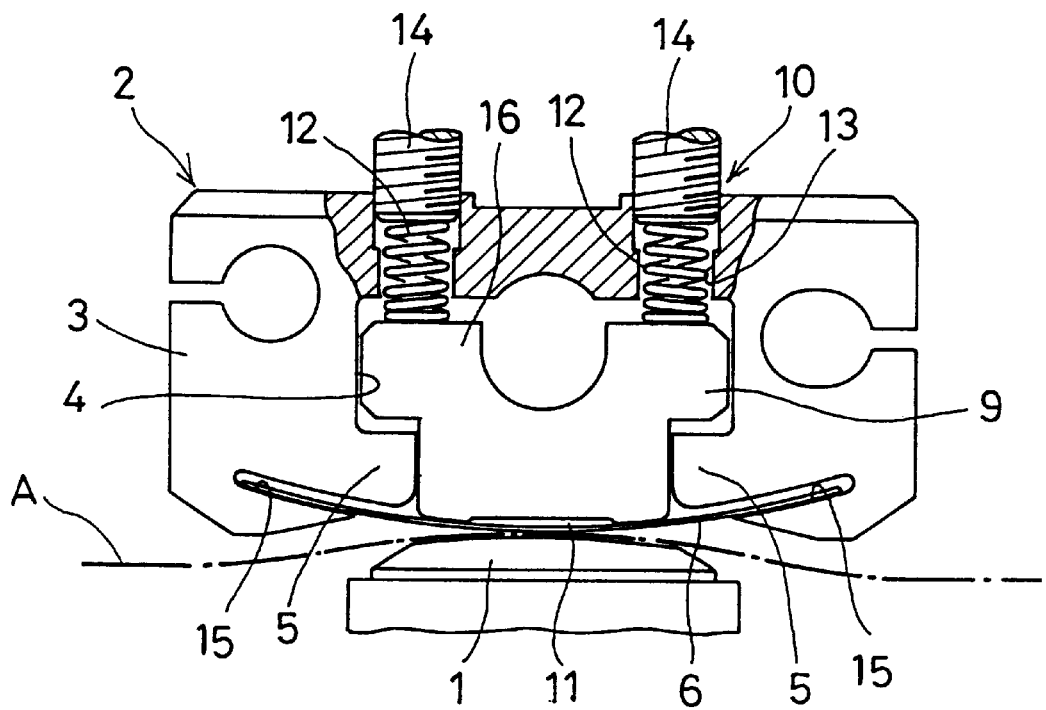
FIG. 4 is a partially cutaway front view of a third embodiment.
Figure 5:
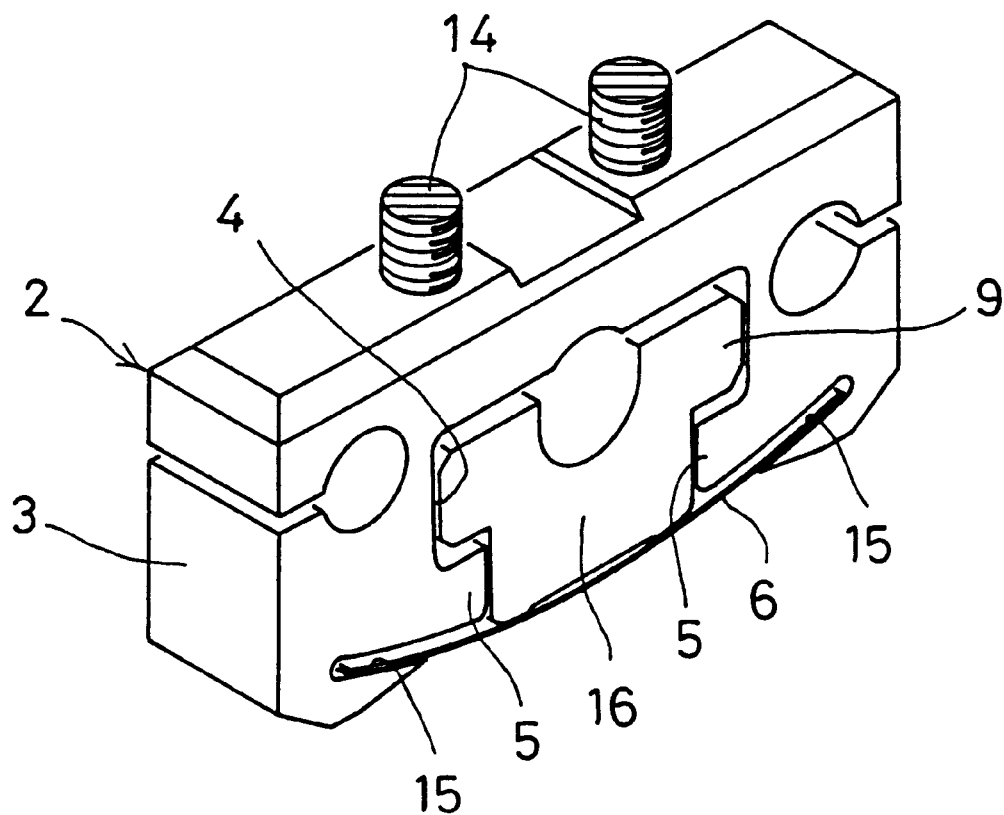
FIG. 5 is a perspective view thereof.

As shown in FIGS. 4 and 5, below the pair of protrusions 5 there are formed a pair of inwardly downwardly sloping slits 15 in which are inserted opposite ends of a resilient member 6 in the shape of a strip.

The resilient member 6 is made from a sufficiently resilient ceramic material such as zirconia. By having its opposite ends inserted in the slits 15, the resilient member 6 is bent downwardly at its central portion into resilient contact with the magnetic head 1.

A block 16 is received in the recess 4. Its downward stroke is limited by abutting contact of a pair of protrusions 9, provided on opposite sides thereof, with the pair of protrusions 5.

The block 16 is biased downward by a biasing means 10 so that its bottom surface will contact the resilient member 6. The contact surface of block 16 that is in contact with the resilient member 6 is formed with a relief 11 that serves to limit resilient deformation of the resilient member 6.

The biasing means 10 comprises springs 12 inserted through holes 13 extending through the holder 3 from its top surface into the recess 4. Tops of springs 12 bear on adjusting screws 14 threaded into the holes 13. Thus, by turning the adjusting screws 14, it is possible to adjust the force of the springs 12 and thus the pressure at which the resilient member 6 is pressed against the magnetic head 1.

In use, the magnetic medium A is fed between the magnetic head 1 and the resilient member 6 while resiliently keeping the magnetic medium A in contact with the magnetic head 1 by resilience of the resilient member 6 to read and write magnetic information.

When the tension in the magnetic medium A changes while information is being recorded or reproduced, the resilient member 6 is deformed resiliently. Since it is resiliently deformed within the relief 11 formed in the block 16, the member 6 is prevented from being deformed beyond the limit that can lead to breakage. Thus, the resilient member 6 is less likely to be broken. Moreover, since the resilient member 6 is made from a ceramic material, it is wear-resistant and less likely to be worn or broken. This considerably lessens the need for replacement of the resilient member 6. Maintenance is thus easier.

Preferably the magnetic medium A is pressed against the magnetic head 1 at a constant pressure. Since the contact pressure depends on dimensional errors of the holder 3, it is necessary to adjust the contact pressure before recording or reproducing information. Specifically, the force of the springs is adjusted to absorb such dimensional errors, by turning the adjusting screws 14.

According to the first two embodiments of this invention, the resilient member is far less likely to be worn because it does not contact the magnetic medium. Since the resilient member does not directly contact the magnetic medium, it is possible to use a durable metallic leaf spring made of a magnetic material. This reduces maintenance necessary for replacement of the resilient member due to wear or breakage.

Since the guide layer is resilient, the magnetic medium can always be brought into contact with the magnetic head in an optimum way.

Further, since the guide layer is a resilient plate strip made of a ceramic material and having its opposite ends inserted in grooves formed in opposite sides of a recess of the holder, the resilient plate strip can be replaced easily if broken.

By fixing the ceramic layer to the resilient member, the holder unit can be assembled easily.

What is claimed is:

1. A magnetic information recording/reproducing apparatus for recording/reproducing magnetic information on a magnetic medium, said apparatus comprising:

a magnetic head;

a holder;

a resilient member supported by said holder for urging the magnetic medium into contact with said magnetic head, said resilient member having a side facing said magnetic head; and a hard guide member made of a nonmagnetic material and provided on said side of said resilient member, thereby maintaining said resilient member out of direct contact with the magnetic head.

2. An apparatus as claimed in claim 1, wherein said hard guide member comprises a resilient plate strip made of a ceramic material.

3. An apparatus as claimed in claim 2, wherein said ceramic material comprises zirconia.

4. An apparatus as claimed in claim 3, wherein said resilient member comprises a metallic leaf spring.

5. An apparatus as claimed in claim 2, wherein said resilient member comprises a metallic leaf spring.

6. An apparatus as claimed in claim 2, wherein said holder has therein a recess within which is received said resilient member, said recess has an opening at a side to confront the magnetic medium, said holder has protrusions at opposite sides of said opening for preventing said resilient member from coming out of said recess, and said holder has grooves at opposite sides of said recess for supporting respective opposite ends of said resilient plate strip.

7. An apparatus as claimed in claim 1, wherein said hard guide member comprises a resilient ceramic layer of ceramic material integrally secured to said resilient member.

8. An apparatus as claimed in claim 7, wherein said ceramic material comprises zirconia.

9. An apparatus as claimed in claim 8, wherein said resilient member comprises a metallic leaf spring.

10. An apparatus as claimed in claim 7, wherein said resilient member comprises a metallic leaf spring.

11. An apparatus as claimed in claim 1, wherein said holder has therein a recess, and said resilient member comprises a strip having opposite ends abutting surfaces of said holder defining said recess.

12. An apparatus as claimed in claim 11, wherein said resilient member is made of magnetic material.

13. An apparatus as claimed in claim 1, wherein said resilient member is made of magnetic material.

14. A magnetic information recording/reproducing apparatus for recording/reproducing magnetic information on a magnetic medium, said apparatus comprising:

a magnetic head;

a holder having therein a recess;

a resilient member supported by said holder for urging the magnetic medium into contact with said magnetic head, said resilient member comprising a strip of ceramic material;

a block mounted in said recess for urging said resilient member toward said magnetic head, said block having a surface directed toward said resilient member, said surface having therein a recess allowing deformation of said resilient member; and biasing structure urging said block toward said resilient member.

15. An apparatus as claimed in claim 14, wherein said biasing structure comprises springs biasing said block toward said resilient member and said resilient member toward said magnetic head, and further comprising screws adjustably mounted in said holder, said springs abutting said screws, such that adjustment of said screws adjusts the pressure of said block on said resilient member and of said resilient member on said magnetic head.

* * * * *